Patented Feb. 9, 1954

2,668,651

UNITED STATES PATENT OFFICE 2,668,651

DEVICE FOR DISCHARGING FRUIT, BULBS, AND SIMILAR ARTICLES FROM TRAVELING CONVEYERS

Andries Wilhelm Jansen, Rijswijk, Netherlands

Application August 12, 1952, Serial No. 303,911

4 Claims. (Cl. 226—93)

1

This invention relates to means for discharging fruit, bulbs, tubers and other articles which are liable to be damaged and are supplied by a conveyor.

When discharging fruit or similar articles from a conveyor for grading, assorting or selecting them the drawback occurs that the articles are injured when they fall down into the collecting bins or receptacles. In order to remove said drawback it has been proposed to provide said bins with a flap or apron of flexible material on which the articles are received. Said flap or apron, however, does not completely avoid damage of the articles as said latter fall down on the articles already lying on the apron.

The invention has for its object to remove said drawback and to this end means are provided for periodically emptying said apron. To this end the aprons may be secured to an endless belt or chain moving in a vertical plane so that the aprons travel over the collecting receptacles.

In the drawing which illustrates an embodiment of the invention:

Figure 1:
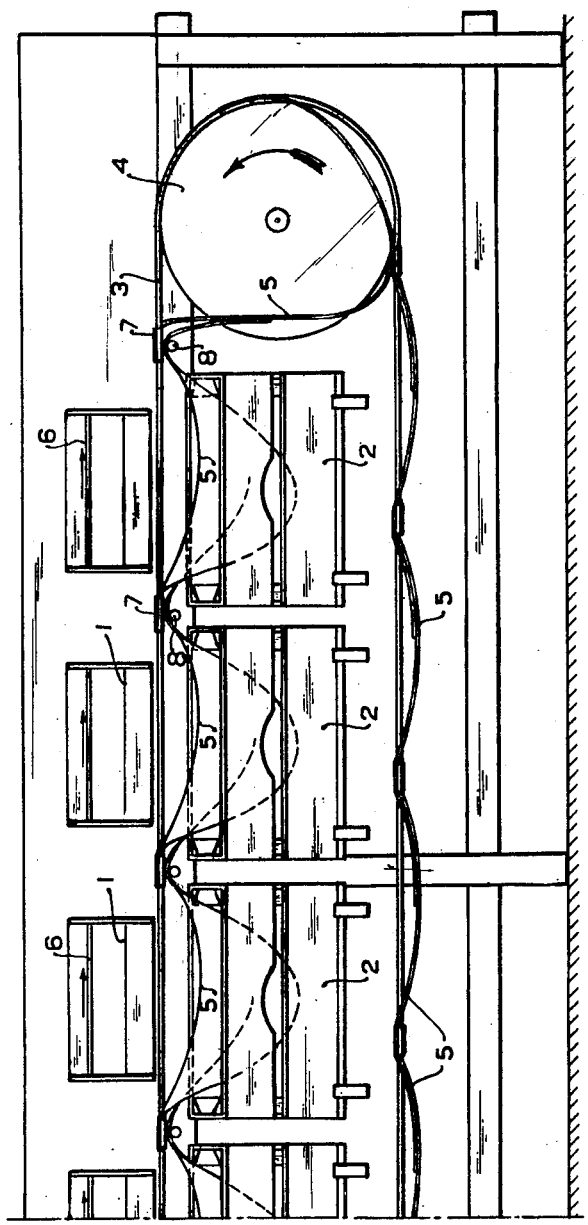
Fig. 1 is a side view of a portion of a sizing apparatus provided with means for emptying the aprons.
Figure 2:
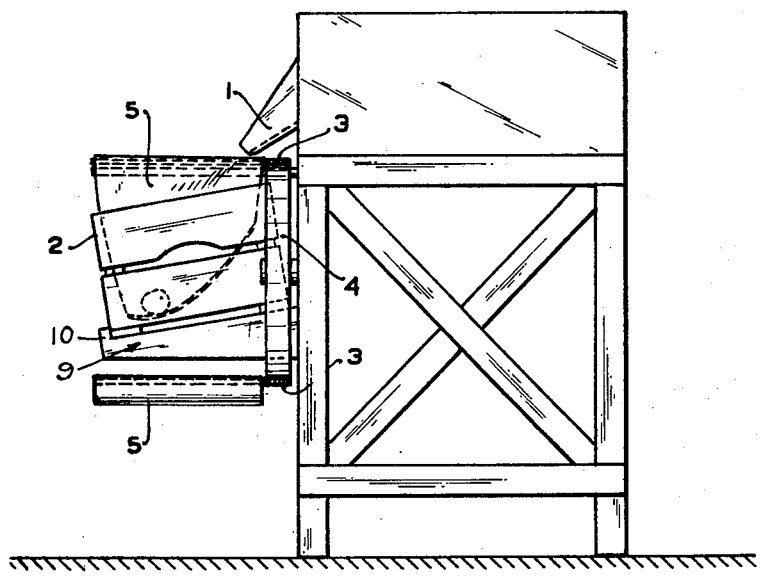
Fig. 2 is an end view of the sizing apparatus shown in Fig. 1.

The apparatus is provided with a continuously moving conveyor belt 6 which receives the fruit to be graded and discharges the fruit through outlets 1 below which collecting receptacles 2 are arranged, each of said receptacles receiving fruit of a definite size. Below the outlets 1 an endless belt or chain 3 is arranged which is passed on two terminal pulleys one of which is shown at 4. Said pulley is continuously driven and the belt 3 carries spaced bars 7 projecting laterally from the belt. To each bar 7 an apron 5 of flexible rubber is secured so that said aprons are slowly moved through the receptacles by the travelling belt or chain. Consequently the articles lying on the apron roll at the free end thereof into the receptacle 2 when said end of the apron leaves the stationary supporting bar 8 and falls down into the receptacle.

The receptacles 2 are removable crates which may be supported on the inclined upper surfaces of brackets 9 that are secured to the frame of the apparatus, and each bracket 9 is provided with a nose 10 to restrain sliding of the crates 2 off the brackets 9.

It will also be possible to disconnect the aprons from the belt 3 and to secure them to stationary bars extending parallel to the bars 8 which latter are then secured to the travelling belt 3 so that the bars 8 continuously move and periodically raise the apron 5 in order to remove the fruit therefrom.

The above described means for discharging articles from a travelling conveyor into collecting receptacles may also be used when the fruit on the conveyor must be subjected to a treatment of any kind e. g. to a brushing operation or be provided with a protecting coating.

What I claim is:

1. In an apparatus, for use in discharging by gravity articles liable to be damaged by impact, in combination, a frame, a transport mechanism movably supported on said frame for conveying said articles, a gate formed on said frame adjacent said mechanism for the discharge therethrough of articles from said mechanism, a receptacle open on top supported on said frame below said gate for receiving through said open top articles discharged by gravity from said gate, and means disposed between said gate and said receptacle and being operable to break the impact of fall of said articles and to deposit the same free from damage into said receptacle, comprising a continuous conveyor having a continuous movement in a horizontal direction above and adjacent said open top of the receptacle, a plurality of flexible aprons at spaced intervals along the conveyor and each having a leading end secured to said conveyor and extending rearwardly from said leading end in a direction opposite to said direction of movement of the conveyor, the rearward trailing end of each of said aprons being unattached and free to flex downwardly from the conveyor as the latter passes over said open top of the receptacle and receives said articles, and supporting means fixedly mounted below the portion of the conveyor which passes over said open top and located at the side of the receptacle which is nearest in the direction from which the successive portions of the conveyor approach said open top, each trailing end successively engaging said supporting means so as to be supported thereby for a short period of time as the apron passes over said receptacle and down into the interior thereof, said apron having a length materially greater than that of said open top.

2. In an apparatus as claimed in claim 1, said supporting means comprising a horizontally extending bar engaging the lower surface of each apron.

3. In an apparatus as claimed in claim 1, together with means for mounting said conveyor for continuous movement comprising a pair of spaced pulleys each mounted on said fame for rotation about a horizontal axis, said conveyor being in the form of an endless flexible member extending around said pulleys and having a horizontal upper portion passing above and adjacent said open receptacle top.

4. In an apparatus, for use in distributing by gravity articles liable to be damaged by impact, in combination, a frame, a transport mechanism movably supported on said frame for conveying said articles, a series of gates formed on said frame adjacent said mechanism for the discharge through each gate of selected articles, a series of receptacles, each receptacle being open on top and supported on said frame and disposed below a gate to receive through said open top the selected articles discharged by gravity from the gate above, and means disposed between said series of gates and said series of receptacles and being operable to break the impact of fall of said articles and to deposit the same into the respective receptacles, comprising, a continuous conveyor having continuous movement in a horizontal direction above and adjacent said open receptacle tops, a plurality of flexible aprons connected at spaced intervals to the conveyor and each having a leading end secured to said conveyor and extending rearwardly from said leading end in a direction opposite to said direction of movement of the conveyor, the rearward trailing end of each of said aprons being unattached and free to flex downwardly from the conveyor as the latter passes over said open tops of the receptacles and receives said articles, a series of supports, one support being disposed near each receptacle and fixedly mounted below that portion of the conveyor which passes over the open top of said receptacle and located at the side of said receptacle from which the successive portions of the conveyor approach the open top of said receptacle, each of said supports so as to be supported in succession by each support for a short period of time as the apron passes over the receptacle near said support and thence down into the interior of said receptacle, each apron having a length materially greater than that of each open top.

ANDRIES WILHELM JANSEN.

References Cited in the file of this patent

UNITED STATES PATENTS

| Number | Name | Date |
| --- | --- | --- |
| 751,676 | Nelson | Feb. 9, 1904 |
| 1,064,194 | Carroll | June 10, 1913 |
| 1,656,890 | Schiff | Jan. 17, 1928 |
| 1,696,554 | Phelps | Dec. 25, 1928 |
| 1,906,331 | Phelps | May 2, 1933 |